J. H. GLAUBER, DEC'D.
THE CITIZENS SAVINGS & TRUST COMPANY, EXECUTOR.
SERVICE CLAMP.
APPLICATION FILED MAY 5, 1913.
1,181,131. Patented May 2, 1916.
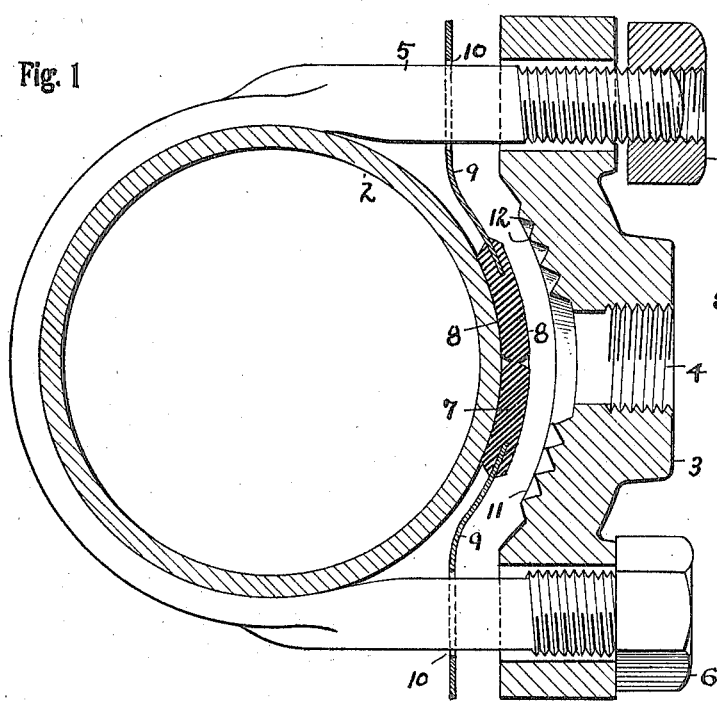
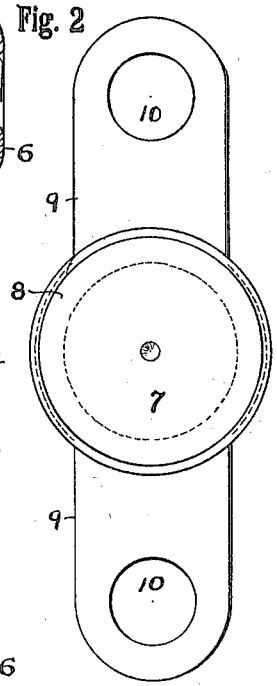
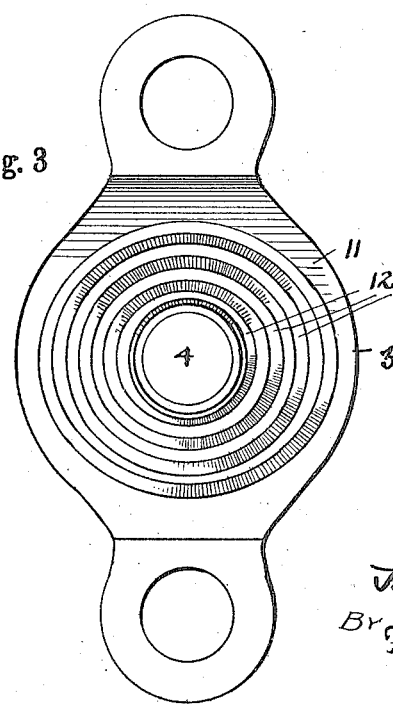
ATTEST
E. M. Fisher
F. C. Mussun
INVENTOR
Joseph H. Glauber
BY Fisher & Moore ATTYS

UNITED STATES PATENT OFFICE.

JOSEPH H. GLAUBER, OF CLEVELAND, OHIO; THE CITIZENS SAVINGS & TRUST COMPANY, EXECUTOR OF SAID GLAUBER, DECEASED.

SERVICE CLAMP.

1,181,131.     Specification of Letters Patent.     Patented May 2, 1916.

Application filed May 5, 1913. Serial No. 765,567.

*To all whom it may concern:*

Be it known that I, JOSEPH H. GLAUBER, citizen of the United States, residing at Cleveland, in the county of Cuyahoga and State of Ohio, have invented certain new and useful Improvements in Service-Clamps, of which the following is a specification.

This invention comprises an improved service clamp of particular utility in the art of water distribution, substantially as herein shown and described and more particularly pointed out in the claims.

In general, the object of the invention is to provide a clamping device whereby a service pipe may be tapped by another pipe in a practical manner and without necessarily resorting to special forms of gaskets or packing. With this end in view I construct the saddle of the clamp in a particular way to provide a safe and effective joint with the use of various kinds of packing, including flat sheet lead.

In the accompanying drawings, Figure 1 is a sectional view of a service pipe and my improved clamp in position to be clamped thereon. Fig. 2 is a side view of the sealing member shown in section in Fig. 1. Fig. 3 is an elevation of the saddle showing the ribbed concave seating face thereof.

The pipe 2 represents a main or service pipe with which a water connection can be made by affixing a saddle 3 in sealed engagement therewith. Tapping or drilling of the pipe is accomplished by suitable tools and appliances entered at the central screw-threaded opening 4 in the saddle, and a yoke or strap 5 and nuts 6 serve to fasten the saddle tightly upon the pipe. However, a sealing member 7 is essential in making a water-tight joint between the saddle and pipe, and the sealing member shown comprises a lead or composition disk having flat faces 8 and a pair of flat and tough sheet-metal extensions 9 which are provided with round openings 10. These open extensions 9 permit the sealing member 7 to be slidably affixed to strap 5, and to be altogether independent of the saddle 3 although bearing a fixed centrally-related position to its concave seat 11.

Pipe 2 is generally of relatively thin metal and of rough exterior and the disk 7 or other packing member must be well compressed to effect a good seal and tight joint, and to this end I provide the concave portion 10 of saddle 3 with a series of circular ribs 12 of V-shape in cross section. These ribs embed themselves in the disk and force the soft material of the disk opposite the edges of the hard ribs 12 into the irregular or rough places of the pipe 2. The sealing points of engagement are, therefore, in concentric circles about opening 4 as two or more of such ribs 12 are certain to engage the disk 7. A perfect seal is thus obtained both with the pipe and the saddle.

In tapping the pipe the boring tool penetrates the disk 7 as well as the pipe; the sealing surfaces of the disk therefore extend outward from the edge of the bore in every instance and no space or pocket is left unfilled at this point. A flat piece of sheet lead may be used in lieu of the sealing member as shown, or I may employ a sealing member of the kind shown and described in my application for Letters Patent filed on even date herewith. In every case a perfect seal can be obtained, thereby indicating the universal applicability and general usefulness of the invention herein shown and described.

What I claim is:

1. As an article of manufacture and sale, a service clamp comprising a yoke and nuts, and a saddle having a central opening and a concave face provided with a series of projecting ribs circularly about said opening and extending from the immediate edge thereof to approximately the outer edge of the saddle.

2. A service clamp comprising a yoke, screw nuts, and a saddle having an opening therein and a concave portion provided with relatively heavy sharp projecting ribs in circles immediately adjacent said opening, in combination with a sealing member to seat within the concave portions of said saddle.

In testimony whereof I affix my signature in presence of two witnesses.

JOSEPH H. GLAUBER.

Witnesses:
F. C. MUSSUN,
E. M. FISHER.

Copies of this patent may be obtained for five cents each, by addressing the "Commissioner of Patents, Washington, D. C."